May 16, 1961 R. H. ANDRESEN ET AL 2,984,505
BOOT EQUIPPED TELESCOPING SEAL
Filed July 23, 1956 4 Sheets-Sheet 4
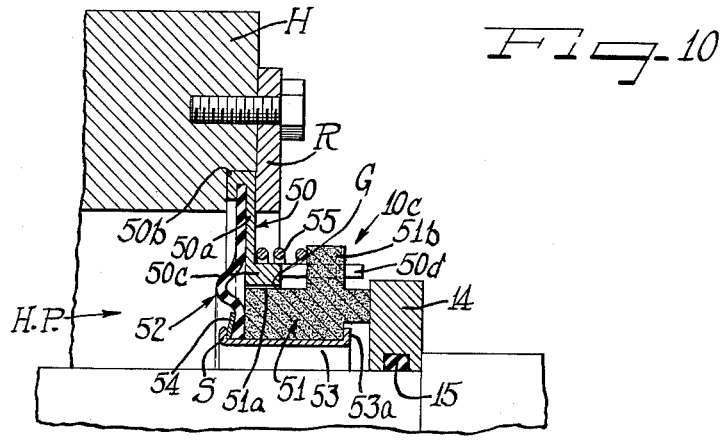
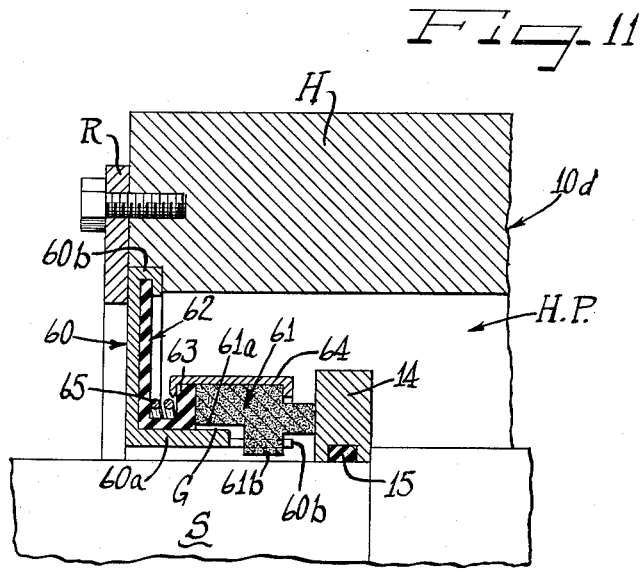
Inventors
Raymond H. Andresen
Hilmar A. Andresen
Attys

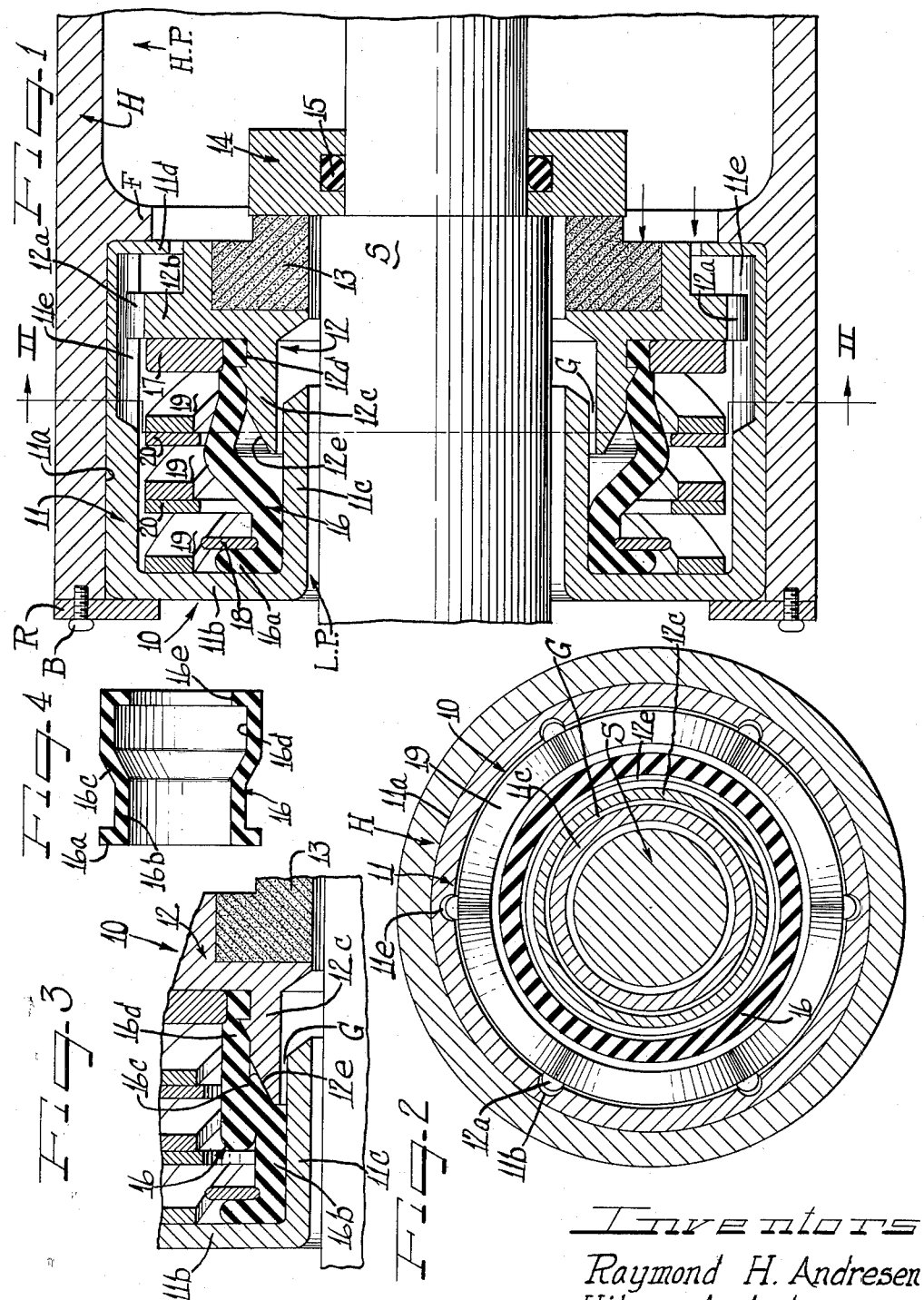

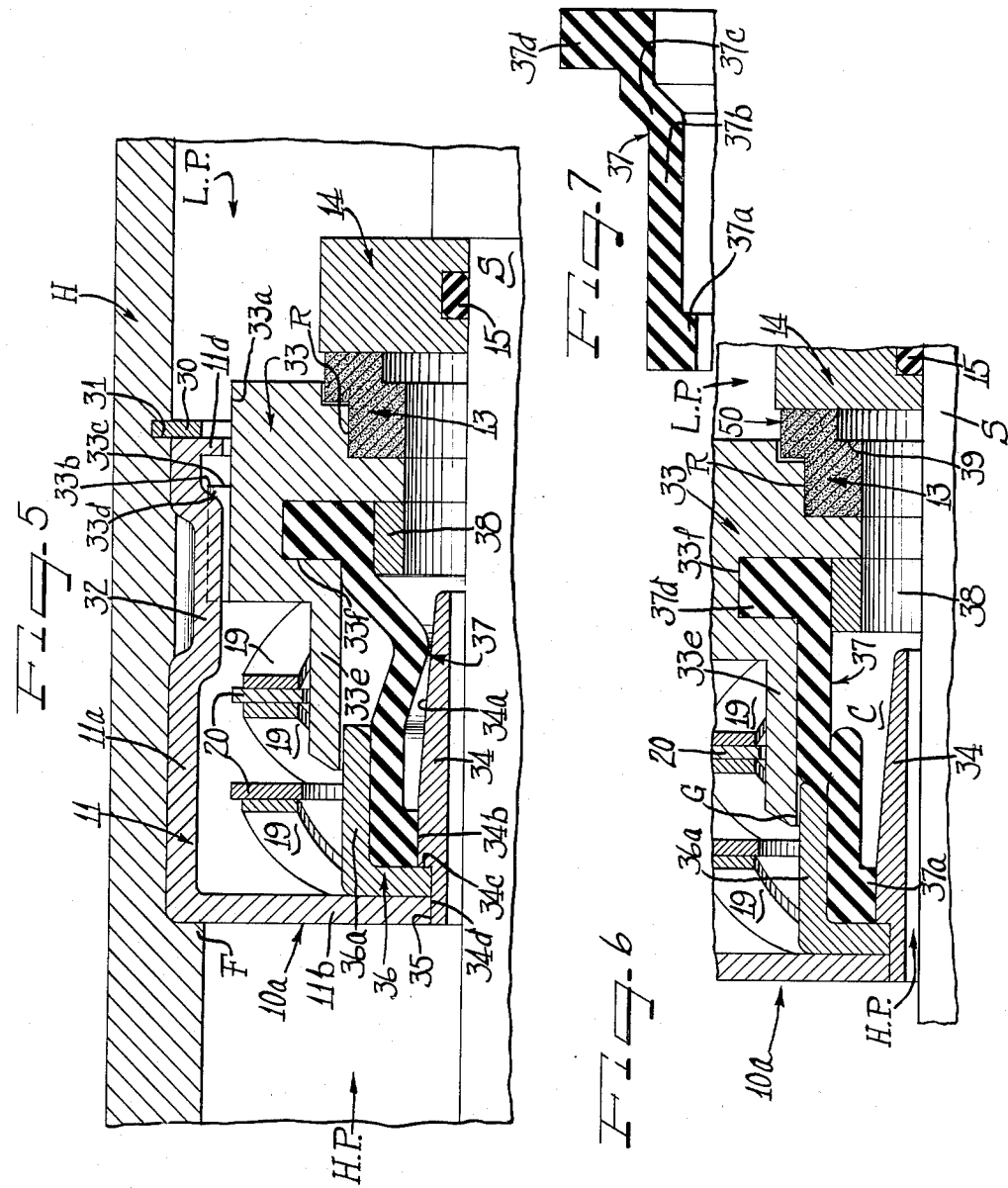

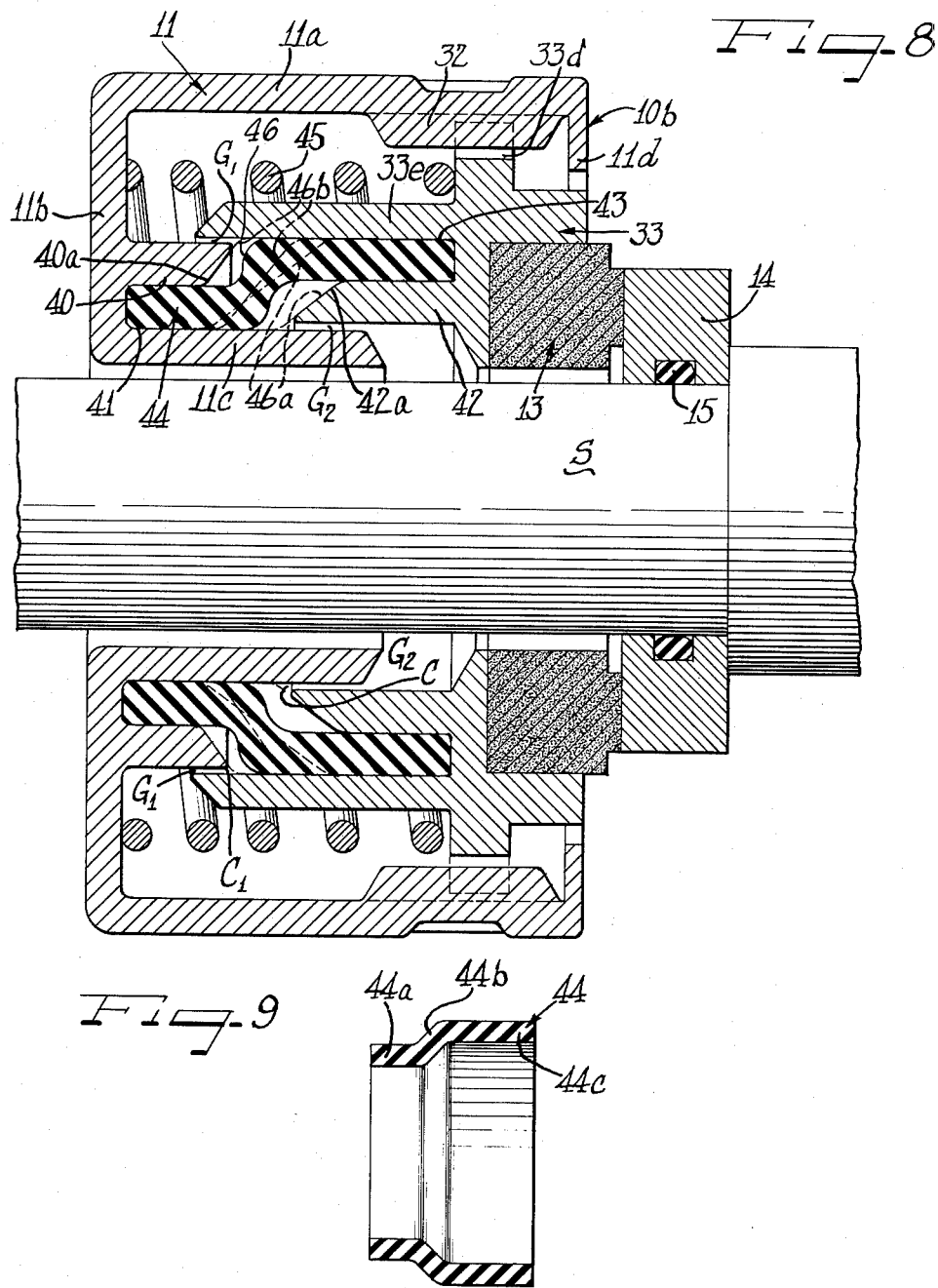

United States Patent Office 2,984,505
Patented May 16, 1961

2,984,505
BOOT EQUIPPED TELESCOPING SEAL

Raymond H. Andresen and Hilmar A. Andresen, both of Cuba Road, Rte. 4, Box 56, Barrington, Ill., assignors to Remi J. Gits, Jr., Hinsdale, Edward C. Gits, La Grange, and Mercantile National Bank of Chicago, Chicago, Ill., a national banking association, as co-trustees Filed July 23, 1956, Ser. No. 599,643

3 Claims. (Cl. 286—11)

This invention relates to shaft seals of the axially shifting and relatively rotating face-to-face type wherein one part is telescoped relative to another part and a pliable boot is sealingly secured at its opposite ends to these parts while its intermediate portion spans and seals any space between the telescoped parts and is adapted to be deformed into full conformity with said parts under pressure while accommodating axial shifting of the parts.

More particularly, this invention deals with a pliable high pressure boot-equipped shaft seal of the axially shiftable relatively rotating face-to-face seal ring type which can be accurately pressure balanced and is free from hysteresis or lagging in adapting its parts to different positions as demanded by wear and changes in sealing pressure.

Shaft seals of the axially shiftable relatively rotating face-to-face seal ring type may be divided into two general classes namely, diaphragm seals and sliding packing type seals. The diaphragm seals quickly change positions to accommodate wear and changes in operating conditions and are thus considered to be free from hysteresis. However, these diaphragm seals must have a relatively large unsupported diaphragm area spanning the gap between the parts being sealed and since one face of this large unsupported area is subjected to pressure while the opposite face is exposed to a low pressure, these seals cannot be accurately pressure-balanced to operate satisfactorily over a range of pressures. Further, such diaphragm seals cannot hold high pressures and are thus only useful in the low pressure field. The sliding packing type seals, on the other hand, tend to stick and have a high hysteresis loss or lag in adapting themselves to changed positions for compensating for wear and variations in pressure.

The present invention now provides a seal which combines the freedom of movement of the diaphragm type seal and the pressure-balance control and high pressure capacity of the sliding packing type seal.

According to this invention, a seal ring or seal ring carrier is telescoped on or in a fixed seal part. The two telescoping parts are loosely fitted so that the seal ring will have free axial movement and a limited radial movement. A pliable rubber, plastic, or other fluid impervious material boot spans the gap between the telescoped parts and is sealingly engaged at its opposite ends with the respective parts. The intermediate portion of the boot is free to accommodate the axial and radial movements of the seal ring. The telescoping parts have support surfaces for the boot and the boot, when subjected to pressure, is deformed against these surfaces into full conformity therewith so that its only unsupported portion is that small area in the gap between the telescoped parts. The boot thus becomes a deformable membrane conforming exactly to the shape of a casing provided by the telescoping seal parts and working with the fluid which it seals. As the seal ring shifts to accommodate wear, additional areas of the telescoped parts will be presented to the boot for additional boot support. Since the telescoped parts have a space therebetween which is free from packing, no frictional contact between the parts will occur and light spring loads are effective to maintain the seal ring in sealing engagement with its relatively rotating part.

A feature of the invention, therefore, is the elimination of hysteresis in high pressure balanced seals by avoiding packing and the like restrictions which interfere with free movement of the seal ring.

Another important feature of the invention is to provide a seal which will not tend to open up a leakage path between the seal ring and its carrier when subjected to high internal pressures.

Another feature of the invention is the provision of a seal which will not stick even when its pliable boot is exposed to fluid which softens or swells the boot material.

It is then an important object of this invention to provide a seal free from hysteresis and capable of maintaining an accurate pressure balance even when exposed to high pressure.

Another object of this invention is to provide a shaft seal of the relatively rotating ring type wherein one of the rings is always adapted to shift to accommodate wear and changes in operating conditions while retaining pressures not capable of being held by diaphragm seals.

Another object of this invention is to provide a seal with a high pressure boot which will accommodate free axial shifting and limited radial displacement of a seal ring.

A still further object of this invention is to provide a seal with a high pressure boot that, in effect, becomes part of the sealed fluid and works with this fluid under pressure to avoid any restrictions in desired movement of the seal ring.

Another object of this invention is to provide a seal having a ring part telescoped relative to a second part and a high pressure boot sealingly engaged at its ends with the parts but having a free intermediate portion spanning the gap between the parts and adapted to be fully supported on the parts when subjected to pressure while accommodating relative movements of the parts.

Another object of the invention is to provide a boot type seal having the boot exposed to pressure and having boot supporting surfaces providing a boot casing which is expansible and contractible to accommodate axial and limited radial movements.

A specific object of this invention is to provide a shaft seal of the relatively rotating carbon ring type wherein the carbon ring part is telescoped relative to a casing part and a boot is secured at its ends to the carbon ring part and the casing part and is exposed to the pressure being sealed so as to be deformed into full conformity with the parts without interfering with their relative movements.

Other and further features and objects of this invention will be apparent to those skilled in this art from the following detailed description of the annexed sheets of drawings which, by way of preferred examples only, illustrate several embodiments of the invention.

On the drawings:

Figure 1 is an axial cross-sectional view of one form of seal according to this invention mounted in a housing so as to be exposed to external pressure.

Figure 2 is a transverse cross-sectional view of the seal of Figure 1 taken along the line II—II of Figure 1.

Figure 3 is a fragmentary axial cross-sectional view of the seal of Figure 1 showing the position of the boot when subjected to external pressure.

Figure 4 is an axial cross-sectional view of the boot for the seal of Figures 1 to 3 showing the free state molded shape of the boot.

Figure 5 is a fragmentary axial cross-sectional view of another form of seal according to this invention especially adapted for internal pressures and showing the seal mounted in a housing for receiving such pressures.

Figure 6 is a view similar to Figure 5 but showing the position of the boot when subjected to internal pressures.

Figure 7 is a view similar to Figure 4 but showing the free state molded shape of the boot in the seal of Figures 5 and 6.

Figure 8 is a view similar to Figure 1 but showing a further modified seal according to this invention adapted for sealing both external and internal pressures and showing the relative positions of the boot when subjected to such pressures.

Figure 9 is a view similar to Figures 4 and 7 but illustrating the free molded shape of the boot in the seal of Figure 7.

Figure 10 is a fragmentary axial sectional view of a still further modified seal according to this invention especially adapted for sealing against internal pressures.

Figure 11 is a fragmentary axial cross-sectional view of a still further modified seal according to this invention especially adapted for sealing against external pressures.

As shown on the drawings:

The seal 10 of Figures 1 to 3, is illustrated as mounted in a housing H equipped with a shaft S and having a high pressure zone H.P. to be sealed from a low pressure zone L.P. The seal 10 is thus externally exposed to the high pressure zone.

The seal 10 includes a metal casing 11 pressed into the housing H against an internal housing flange F and held in the housing by a ring flange R detachably connected to the housing as by means of studs, screws or bolts B.

The casing 11 has a main cylindrical side wall 11a which snugly fits in the housing H and has an end wall or front wall 11b in right angular relation thereto spanning the gap between the housing and an integral tubular sleeve portion 11c which loosely embraces the shaft S. This tubular portion 11c projects inwardly from the wall 11b to terminate inside of the casing. The opposite end of the casing has a spun-in flange 11d bottomed on the housing flange F but terminating radially outward from the tube 11c. Therefore, the wall 11b is of considerably greater radial depth than the flange 11d.

The side wall 11a is provided with a plurality of circumferentially-spaced internal grooves 11e extending inwardly from the flange 11d.

A metal carbon seal ring carrier ring 12 is fitted freely in the casing 11 and has ribs or lugs 12a freely slidable in the grooves 11e to hold the ring against rotation in the casing while accommodating free axial shifting of the ring.

The ribs 12a are on a radial flange portion 12b of the ring 12 which fits loosely in the side wall 11a of the housing but is of greater diameter than the opening provided by the housing end flange 11d so as to retain the carrier 12 in the housing. The carrier 12 has a recess receiving a carbon sealing ring 13 which has a nose portion projecting beyond the casing flange 11d into face-to-face sealing engagement with a rotating metal seal ring 14 secured on the shaft S. A rubber seal ring 15 is mounted in an internal groove in the seal ring 14 to sealingly engage the shaft S to prevent leakage between the shaft and ring 14. As shown, the ring 14 is bottomed against a shoulder of the shaft and is press-fit sufficiently tight to the shaft so as to be fixed thereto for co-rotation therewith.

The carrier ring 12 has a tubular projection 12c radially inward from the flange 12b thereof and overlying the tubular portion 11c of the casing in spaced concentric relation therewith. This tubular projection 12b has an external groove 12c at its root end. A pliable rubber, plastic, or other fluid impervious material boot 16 surrounds the tubes 11c and 12c of the casing and carrier ring, respectively, and has one end thereof sealingly seated in the groove 12d and the other end thereof bottomed against the casing wall 11b.

A metal clamping ring 17 bottomed on the carrier ring 12, surrounds one end of the boot 16 to secure this end in the groove 12d. A second clamping ring 18 surrounds the other end of the boot 16 and is bottomed against an external end flange 16a of the boot to hold this flange into sealed engagement with the wall 11b. A stack of wave washer springs 19 with interposed flat washers 20, surrounds the boot 16 with one end bottomed on the casing wall 11b and the other end urged against the clamping ring 17.

The spring stack urges the carbon seal ring 13 against the side face of the rotating seal ring 14 and can be modified so as to provide any desired sealing load against the rotating seal ring.

The telescoped tubular portions 11c and 12c have cylindrical support surfaces on which the boot 16 can rest. The end portions of the boot fit snugly around these tubular portions.

In its free state, the boot or sleeve 16, shown in Figure 4, has the end flange 16a for bottoming against the casing wall 11b, a small diameter cylindrical portion 16b for snugly fitting on the tube 11c, an outwardly flaring inclined portion 16c in the central zone thereof, a cylindrical enlarged end portion 16d for snugly fitting around the tube 12c, and an inturned bead 16e for fitting in the groove 12d.

When the seal 10 is in its free or unloaded state, the flange 12b of the carrier ring 12, is bottomed against the casing flange 11d and the boot 16 is in approximately its free state position as shown in Figure 4. However, when the seal 10 is pressed into the housing H so that the carbon ring 13 is bottomed against the rotating shaft ring 14, the carrier ring flange 12b is depressed into the housing away from the end flange 11d thereby loading the spring stack and deforming the intermediate portion of the boot 16 off of the tubes 11c and 12c. Thus, the boot length is shortened and the boot is bulged outwardly. The spring stack is of sufficient internal diameter to accommodate free bulging of the boot. The free end of the tubular portion 12c which overlaps the tube 11c has an external tapered face 12e underlying the bulged portion of the boot and adapted to receive the inclined or flared portion 16c of the boot as shown in Figure 3 when the boot is externally loaded.

It will be noted that the telescoped tubes 11c and 12c have a relatively narrow gap G therebetween in the operating position of the seal 10. This gap will accommodate limited relative radial displacement of the seal ring carrier 12 and casing 11 and it will be noted from Figure 2 that the grooves 11e in the casing are deeper than the ribs or lugs 12a of the ring 12 so as not to interfere with this permissible limited radial displacement.

The gap G also accommodates free relative axial movement between the seal ring carrier 12 and the casing 11.

When the seal is externally exposed to high pressure from the zone H.P. in the housing H, the high pressure will act on the exterior of the boot 16 to deform it into full conformity with the tubes 11c and 12c as shown in Figure 3 with the boot portion 16b tightly seated against the tube 11c, the flared boot portion 16c tightly seated against the inclined tube lip 12e and the boot portion 16d tightly seated against the root of the tube 12c. Thus, the only unsupported portion of the boot 16 is that portion which spans the narrow gap G between the telescoped parts and this gap is sufficiently narrow that the tube cannot appreciably extrude into the gap to form a locking wedge interfering with free relative radial and axial movements of the tubes.

Thus, the high pressure zone H.P. is effectively sealed from the low pressure zone L.P. and the boot is fully supported on rigid surfaces so that it cannot burst. The boot, in effect, becomes part of the high pressure working fluid to assist the spring stack in urging the seal ring 13 against the rotating ring 14 thereby increasing the sealing load as pressures are increased.

Since the gap G insures free relative movements of the casing and seal ring parts, the spring stack need only exert a relatively light load to maintain the carbon ring 13 in proper sealing engagement against the rotating ring 14. If eccentricities should develop during the operation or if the parts should be initially misaligned, this misalignment is accommodated by the gap G which permits limited radial displacement of the parts.

In the modified seal 10a of Figures 5 and 6, parts corresponding with the above described parts in connection with the seal 10 of Figures 1 to 3, have been generally identified by the same reference numerals while the modified portions of these parts are hereinafter more fully explained.

In Figure 5, the seal assembly 10a is illustrated as mounted in a housing H and around a shaft S wherein the high pressure zone H.P. of the housing communicates with the interior of the seal assembly along the shaft S and is sealed from the low pressure L.P. which communicates with the exterior of the seal assembly. This is a reversal of the venting of the seal parts from that shown in Figures 1 to 3 and the seal 10a is therefore referred to as an internal seal as contrasted with the external seal 10.

The seal casing 11 is pressed into the housing against the abutment flange F and is retained in position by a snap-ring 30 projecting from a groove 31 in the housing to abut the inturned flange 11d of the casing.

Instead of being internally grooved to provide means for locking the carbon ring carrier ring against rotation, the casing 11 of the seal 10a has a series of circumferentially spaced internal axially extending ribs 32 which are formed by indenting the side wall 11a of the casing near the flange 11d. These ribs can be spaced the same as the grooves 11e as shown in Figure 2.

The carrier ring 33 for the carbon ring 13 has a cylindrical peripheral wall 33a of a diameter to fit freely within the opening provided by the casing flange 11d. This diameter is increased to provide a larger diameter cylindrical periphery 33b which is greater than the opening provided by the flange 11d but less than the interior bore of the casing wall 11a. A shoulder 33c is thus provided which will abut the flange 11d to retain the carrier within the casing.

The large diameter portion 33b of the carrier ring is castellated or axially grooved at intervals to mate with the ribs 32 thereby providing grooves 33d receiving the ribs and accommodating axial shifting of the carrier ring while retaining it against rotation in the casing.

The carrier ring 33 has a recess in its front face receiving the carbon ring 13 and a tubular portion 33e projecting from its back face into the casing. An internal groove 33f is provided in the carrier ring 33 at the root of the tubular projection 33e.

A tube or sleeve 34 corresponding with the integral tubular projection 11c of the casing 11 of Figures 1 to 3, is press-fitted into the opening of the end wall 11b of the casing of Figures 5 and 6. This tube or sleeve 34 has a large internal diameter to loosely embrace the shaft S and provide a gap between the shaft and tube.

The tube has a tapered external wall 34a sloping outwardly from a thin free end to a cylindrical wall 34b. This wall 34b terminates at a radial shoulder 34c and a reduced diameter end wall portion 34d continues from the shoulder 34c to the end of the tube to be press-fitted into the circular opening 35 provided by the casing wall 11b.

A combined clamping ring and tube or sleeve 36 has an end wall clamped against the casing wall 11b by the shoulder 34c of the tube 34 and has a tubular rim 36a overlying the tube 34 in spaced concentric relation.

A pliable boot or sleeve 37 corresponding with the boot 16 of the seal of Figures 1 to 3, surrounds the tube 34 and lies inside of the tube 33e and tubular rim 36a. This boot is composed of flexible impervious material such as rubber, plastic, or the like, and, in its molded free state, as shown in Figure 7, has an inturned bead or rib 37a at one end thereof, an elongated cylindrical portion 37b providing the main side wall, an outwardly flared portion 37c, and an external upstanding bead or rib 37d at the opposite end thereof. The rib 37a snugly embraces the cylindrical wall 34b of the tube 34 and the clamping ring 36 embraces the beaded end to maintain a sealed engagement with the tube. The rib or bead 37d at the opposite end of the boot is seated in the groove 33f of the carrier ring 33. An internal clamping ring 38 is pressed into the large diameter end of the boot to hold the rib 37d in the groove of the carrier ring.

When thus clamped within the groove 33f of the carrier ring and on the tube 34, the main body 37b and the inclined or flared portion 37c of the boot, lie between the tapered wall 34a of the tube and the internal cylindrical walls of the tubular extension 33e and tubular rim 36a. In the free state, these portions of the boot can flex in the chamber between these tubes and when the carbon ring is pressed against its cooperating rotating ring 14 so as to compress the spring stack 19 and move the carrier ring shoulder 33c inwardly from the flange 11d, the side wall of the boot will be inwardly bowed as shown in Figure 5. The tapered wall 34a of the tube 34, however, will support the boot to hold it out of contact with the rotating shaft S.

As shown in Figure 6, when the interior of the seal assembly 10a is exposed to pressure, the boot 37 will be inflated or deformed to lie against the internal wall of the carrier ring tube 33e and the rim 36a of the clamping ring 36. Thus, the boot is fully supported except for that small area thereof which spans the narrow gap G between the telescoped tube 33e and rim 36a.

An important feature of the internal seal is the ease in which it can be pressure-balanced as desired to assist the spring stack in maintaining good sealing contact between the carbon ring 13 and the rotating ring 14 without creating conditions where the carbon ring will tend to be unseated from the carrier ring recess. Thus, as shown in Figures 5 and 6, an annular recess R is formed in the outer peripheral surface of the carbon ring 13 and the diameter of the recess R receiving the carbon ring is held to the same diameter or smaller than the diameter of the internally sealed chamber C and the surrounding boot 37 which actually forms part of the fluid under pressure in this chamber.

Therefore any pressure leaking into the recess from interior of the seal along the bottom of the recess cannot become effective to blow the carbon ring out of the recess, for the carbon ring rides tightly on the axially immovable rotating ring, and because of the diameter which balances out applied pressures it cannot cause the carrier to be shed by pushing it back against the spring stack while holding the carbon in contact with the rotating face 14. The larger diameter 50 provides the means necessary to properly balance out the seal face pressure, as applied by the fluid pressures sealed to the rotating faces. Thus, by increasing the internal and external diameters the applied load is lessened, conversely it is greater if the diameters are smaller.

Therefore, it should be understood that the seal of Figures 5 and 6 is an internal seal operating in the same manner as the external seal of Figures 1 to 3.

In Figure 8, the seal assembly 10b is effective to seal against internal or external pressures and parts corresponding with parts described in Figures 1 to 7, have been marked with the same reference numerals.

In Figure 8, the clamping rings 36 and 38 of the seal 10a, are eliminated and the back wall 11b of the casing has a cylindrical tubular rib 40 projecting inwardly therefrom in spaced concentric relation around the tube 11c to replace the clamping ring 36 and provide between the tubes 11c and 40 a circular well or groove 41. Similarly, the carrier ring 33 is provided with a circular tubular portion 42 in spaced concentric relation inwardly from the tube 33e and coacting therewith to form a circular well or groove 43. The grooves or wells 41 and 43 are radially offset since the tube 40 telescopes inside of the outer tube 33e to provide a first small clearance gap $G_1$ while the tube 11c telescopes inside of the tube 42 to provide a second small clearance gap $G_2$.

A rubber or plastic boot 44 has its opposite ends sealingly seated and clamped in the grooves 41 and 43 respectively, and has an intermediate flaring portion extending across the space provided between the outer wall of the inner tube 11c, the inner wall of the outer tube 33e and the chamber C between the tubes 40 and 42.

As shown in Figure 9, the boot 44, in its free state, has a small diameter end 44a for seating in the groove 41, an outwardly flaring side wall portion 44b and a large diameter main body portion 44c continuing from the outer end of the flare 44b to the end of the tube. A portion of this large diameter 44c is sealed in the groove 43. The flared portion 44b spans the space between the grooves in the chamber C and when the carrier ring is backed off of the end flange 11d to partially compress the helical spring 45, this intermeidate portion 44b is bowed as illustrated at 46. When the seal is exteriorly loaded, the bowed portion 46 will be deflected to lie against the tapered end 42a of the tube 42 and also against the outer wall of the tube 11c as shown in dotted lines 46a. Conversely, when the boot is subjected to internal pressures through the gap $G_2$ this bowed portion 46 will lie against the end wall 40a of the tube 40 and also against more of the internal wall of the tube 33e as shown in dashed lines 46b. In either condition, the boot is fully supported on rigid walls.

The telescoping parts defining the gaps $G_1$ and $G_2$ are in spaced relation and do not impede any axial shifting of the carrier ring 33 while, at the same time, accommodating limited radial displacement of the ring. As axial displacement occurs, more supporting surface is presented to the boot and this surface will be clean because it is on the side of the boot that is not exposed to the working fluid.

This seal 10b can also be nicely pressure-balanced for use either as an internal or external seal by control of the area of the seal nose of the carbon ring 13 relative to the internal or external areas exposed to pressure. As noted, the sealing face extends slightly beyond the diameter of the chamber C being sealed and also slightly beyond the corresponding chamber $C_1$ that would be sealed if the seal were used as an external seal.

From the above description of Figure 8, it will be understood that the seal 10b combines the external sealing features of the seal 10 with the internal sealing features of the seal 10a.

In Figure 10, there is illustrated a further modified seal 10c utilizing a radial type boot. In the seal assembly 10c, a casing 50 is secured in position in a housing H by means of a retaining plate or ring R. The casing 50 has a radial wall 50a extending from a grooved rim 50b radially inward to a cylindrical boss 50c telescoped over a carbon sealing ring 51 having a sealing nose riding on the rotating ring 14 as explained above in connection with the carbon ring 13. This carbon ring 51 has an external cylindrical portion 51a fitting freely in the boss 50c and having a clearance gap relationship G therewith.

The boss 50c has an axially projecting thinner castellated rim portion 50d surrounding the carbon ring 51 in spaced relation. The carbon ring 51 has lugs 51b thereon projecting from the cylindrical periphery 51a thereof to fit in the grooves provided by the castellated rim 50d and to thereby connect the carbon ring with the casing 50 for relative axial movement while holding the assembly against relative rotating movement.

A radial type rubber or plastic boot 52 is sealed at its outer periphery in the groove of the casing rim 50b, spans the gap G between the telescoping boss 50c and carbon ring 51 and extends to the inner diameter of the carbon ring. A metal ferrule 53 extends through the carbon ring 51 and has a head 53a bottomed on an external shoulder provided on the carbon ring. A washer 54 overlies the inner end of the boot 52 and surrounds the ferrule. The ferrule is spun outwardly over the washer so that the inner periphery of the boot 52 will be clamped between the washer and the inner face of the carbon ring.

A coil spring 55 surrounds the boss portion 50c of the casing and acts against the lugs 51b of the carbon ring to urge the ring into sealing engagement with the rotating ring 14.

The seal 10c thus has telescoped casing and seal ring portions and has a boot supported by the casing and seal ring portions and spanning the gap at the telescopic joint. The boot has a free intermediate portion accommodating axial shifting of the sealing ring as well as limited radial displacement thereof. When pressure in the high pressure zone H.P. of the housing H acts on the boot 52, it is deformed into full conformity with its rigid supporting surface of the casing and seal ring in the same manner as described in connection with the seals 10, 10a and 10b.

The seal assembly 10d of Figure 11 is similar to the seal assembly 10c of Figure 10 except that the parts are arranged to provide an external seal. As shown in Figure 11, the casing 60 is secured in the housing H by retaining ring R and extends radially toward a shaft S. The inner end of the casing has a tubular boss portion 60a surrounding the shaft in spaced concentric relation. A castellated rim portion 60b extends axially from the boss 60a and has an external diameter less than the diameter of the boss portion. A carbon sealing ring 61 rides on the conventional rotating ring 14 and has an internal cylindrical wall 61a surrounding the boss 60a in spaced concentric relation to provide a clearance gap therebetween. Lugs 61b on the internal wall 61a fit into the slots provided by the castellated rim 60b so that the ring 61 cannot rotate relative to the tubular boss 60a.

A radial type boot 62 is clamped at its outer peripheral end in the internally grooved rim 60b of the casing and overlies the radial wall of the casing and the tubular wall. The inner end of the boot is clamped between the inner face of the carbon sealing ring and a washer 63 which is held in position by a metal ferrule 64 surrounding the carbon sealing ring.

A spring 65 is compressed between the radial portion of the boot 62 and the washer to urge the carbon sealing ring 61 against the rotating ring 14.

The seal assembly 10d thereby has telescoped axially shiftable seal ring and casing parts with a boot supported by these parts and spanning the gap provided by the telescopic joint. Pressure in the zone H.P. of the housing H acts externally of the seal ring and is effective to urge the boot against the casing and seal ring so that it will be supported at all areas except that small area which spans the gap G.

From the above descriptions it will be understood that the various forms of the seals of this invention each embody telescoped parts which are free for axial shifting and which accommodate limited radial displacement. Each of the seals of this invention have a boot forming part of the high pressure chamber being sealed and supported by the axially shiftable telescoped parts.

It will be understood that variations and modifications may be effected without departing from the scope of the novel concepts of this invention.

We claim as our invention:
1. A shaft seal free from hysteresis and adapted to maintain accurate pressure-balance control which comprises a stationary seal ring to be positioned in face-to-face sealing engagement with a rotating seal ring, a carrier ring receiving said stationary seal ring, a casing surrounding said carrier ring, means on said carrier ring and in said casing to hold the carrier ring against rotation in the casing while accommodating axial shifting of the carrier ring, said carrier ring and said casing each having overlapped closely spaced concentric tubular portions with cylindrical surfaces facing in the same radial direction, and a boot spanning said tubular portions and supported on said cylindrical surfaces along its entire length, said cylindrical surfaces forming a continuous unitary support surface for the boot.

2. A shaft seal free from hysteresis and adapted to maintain accurate pressure-balance control which comprises a stationary seal ring to be positioned in face-to-face sealing engagement with a rotating seal ring, a carrier ring receiving said stationary seal ring, a casing surrounding said carrier ring, means on said carrier ring and in said casing to hold the carrier ring against rotation in the casing while accommodating axial shifting of the carrier ring, said carrier ring and said casing each having overlapped closely spaced concentric tubular portions with cylindrical surfaces facing in the same radial direction, a boot spanning said tubular portions and supported on said cylindrical surfaces along its entire length, said cylindrical surfaces forming a continuous unitary support surface for the boot, and an inclined face at the end of the outermost of said cylindrical surfaces with respect to the boot facing the boot and tapering inwardly toward the other cylindrical surface for providing a smooth transition support ramp between said surfaces.

3. A seal in accordance with claim 1 in which said cylindrical surfaces both face radially outwardly.

References Cited in the file of this patent

UNITED STATES PATENTS

| | | |
|---|---|---|
| 1,866,967 | Durham | July 12, 1932 |
| 2,287,207 | Vedovell | June 23, 1942 |
| 2,432,694 | Snyder | Dec. 16, 1947 |
| 2,443,151 | Schmitz | June 8, 1948 |
| 2,521,137 | Vedovell | Sept. 5, 1950 |
| 2,645,507 | Isenbarger | July 14, 1953 |
| 2,658,775 | Murphy | Nov. 10, 1953 |
| 2,753,198 | Ayling | July 3, 1956 |
| 2,798,750 | Tankus | July 9, 1957 |
| 2,856,219 | Kosatka | Oct. 14, 1958 |
| 2,899,219 | Payne | Aug. 11, 1959 |